United States Patent

Quinn

[15] 3,657,635

[45] Apr. 18, 1972

[54] DIGITAL PHASE SHIFT FREQUENCY SYNTHESIZER

[72] Inventor: Richard D. Quinn, Palos Verdes Estates, Calif.

[73] Assignee: Hughes Aircraft Company, Culver City, Calif.

[22] Filed: June 25, 1970

[21] Appl. No.: 49,687

[52] U.S. Cl. ............................................................321/69 R

[51] Int. Cl. ............................................................H02m 5/00

[58] Field of Search ...............................321/7, 18, 60, 69 SW

[56] References Cited

UNITED STATES PATENTS

| | | | |
|---|---|---|---|
| 3,430,073 | 2/1969 | Leonard | 321/DIG. 1 |
| 3,052,833 | 9/1962 | Coolidge | 321/DIG. 1 |
| 3,340,469 | 9/1967 | Catherall et al. | 321/DIG. 1 |
| 3,100,851 | 8/1963 | Ross et al. | 321/DIG. 1 |
| 3,521,143 | 7/1970 | Anderson et al. | 321/18 X |

*Primary Examiner*—William M. Shoop, Jr.
*Attorney*—W. H. MacAllister, Jr. and George Jameson

[57] ABSTRACT

A digital phase shifter for synthesizing an output frequency where, in one embodiment, a counter is responsive to first clock pulses received from a clock generator via an inhibit circuit to produce a plurality of output signals which selectively switch a plurality of resistors in or out of the input circuit of an amplifier to digitally produce an output frequency. Any output frequency within a desired band may be generated upon the application of a corresponding binary command number to an arithmetic unit, which continually adds the command number to itself at each occurrence of second clock pulses. Each time that the count of the arithmetic unit overflows an inhibit signal is applied to the inhibit circuit to prevent the following first clock pulse from being passed to the counter, thereby shifting the phase and hence the frequency of the output signal by changing the counting period of the counter. The output frequency is an inverse function of the amplitude of the command number.

13 Claims, 7 Drawing Figures

INVENTOR
RICHARD D. QUINN,
BY
Walter J. Adam
ATTORNEY

DIGITAL PHASE SHIFT FREQUENCY SYNTHESIZER

BACKGROUND OF THE INVENTION

1. Field of the Invention

This invention relates to frequency synthesizers and particularly to a digital phase shift frequency synthesizer employing improved digital techniques.

2. Description of the Prior Art

Some mechanizations of digital phase shift frequency synthesizers have used an array of delay lines to develop the phase shift increments by selectively switching the output of a reference oscillator through one or more delay lines of a plurality of delay lines in order to sequentially shift the phase of the oscillator output by predetermined increments. In one type of delay line array, the delay lines are parallel coupled and only one delay line is selected at any one time. In another type of delay line array the delay lines are selectively coupled in series to obtain the desired delay at any given time.

Other mechanizations of digital phase shift frequency synthesizers employ an array of quadrature driven impedance elements to develop the phase shift increments by selectively applying switch points in the array to the output.

In the aforementioned arrays the phase shift increments are difficult to control and the signal amplitudes at the switch points are difficult to equalize, since adjustments of individual amplitudes and delays are not independent of each other. In addition, whenever a much larger number of phase shift increments per cycle is required, the bulk, cost, complexity and difficulty of adjustment all increase accordingly.

SUMMARY OF THE INVENTION

Briefly, Applicant has provided a digital phase shift frequency synthesizer wherein an inhibit circuit is controlled by an arithmetic unit to periodically interrupt a train of clock pulses to a counter so as to cause the output signals of the counter to determine the rate of phase shifting, and hence the output frequency of a digital-to- analog converter.

It is therefore an object of this invention to provide a system for synthesizing any one of a plurality of output frequencies within a desired frequency band.

Another object of this invention is to provide a frequency synthesizer system capable of very rapid switching in output frequency while retaining phase coherency during the frequency changes.

Another object of this invention is to provide an improved digital phase shift frequency synthesizer which provides a large number of phase shift increments per output cycle.

A further object of this invention is to provide a relatively compact and economical digital frequency synthesizer which utilizes an easily controllable digital phase shifter.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENTS

Figure 1:
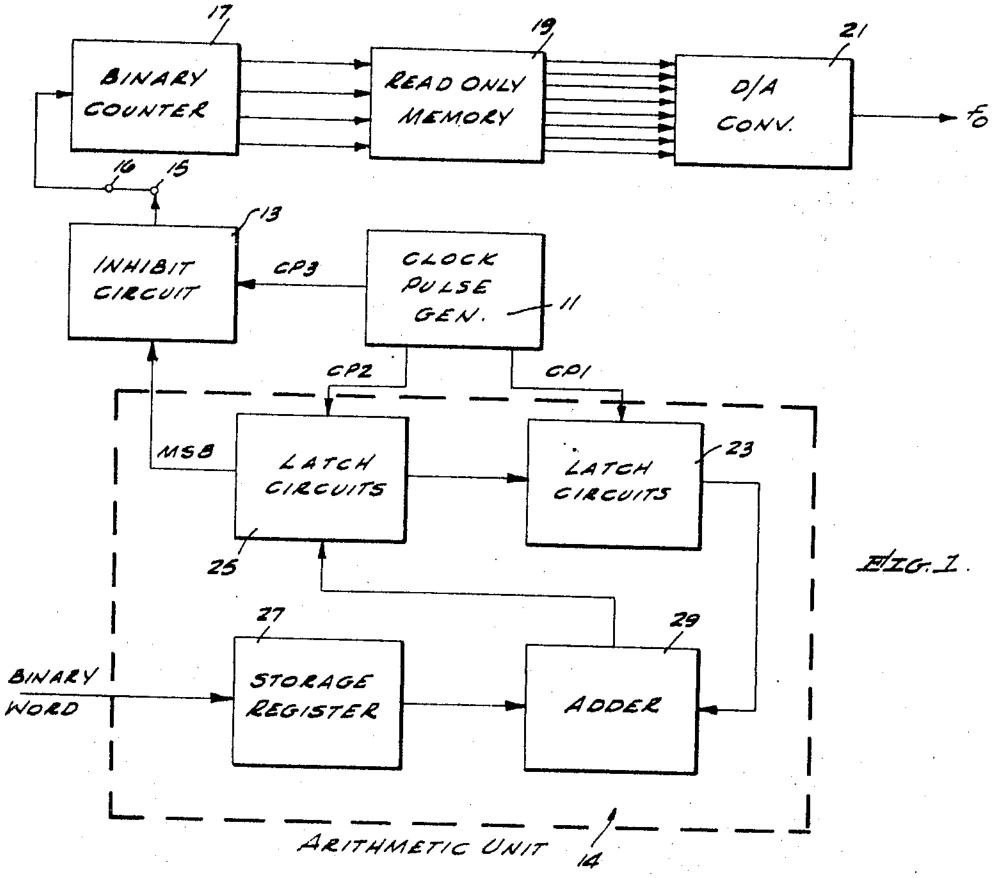
FIG. 1 is a schematic block diagram of a digital phase shift frequency synthesizer in accordance with one embodiment of this invention.

Referring now to the drawings, FIG. 1 illustrates a schematic block diagram of a digital phase shift frequency synthesizer in accordance with one embodiment of the invention. The embodiment of FIG. 1 can best be explained by also referring to FIGS. 2–4. A clock pulse generator 11, which may be of a conventional type, produces three output streams of clock pulses, namely, CP1, CP2, and CP3. The CP1 pulses occur at the same frequency as the CP2 pulses but are shifted in phase so that they are displaced in time from the CP2 pulses. The CP3 pulses are phase coherent with the CP1 and CP2 pulses and may occur at a frequency equal to, or an integral multiple of the frequency of the CP1 and CP2 pulses. The clock pulse generator 11 applies the continuous stream of CP3 clock pulses to an inhibit circuit 13 which will be later described in more detail. The function of the inhibit circuit 13 is to inhibit one of the CP3 clock pulses each time that a most significant bit (MSB) from a control or arithmetic unit 14 changes from a "1" state to a "0" state. Whenever the MSB from the arithmetic unit 14 is not changing from a "1" state to a "0" state, the inhibit circuit 13 allows the stream of CP3 clock pulse to pass therethrough and through terminals 15 and 16 to a conventional binary counter 17 without being inhibited.

Figure 2:
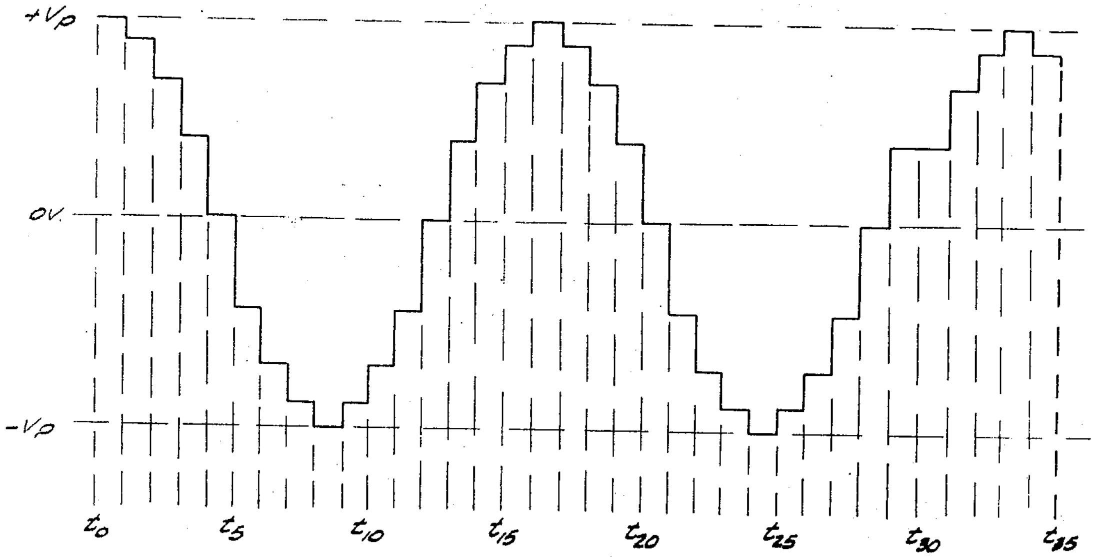
FIG. 2 is a graph which illustrates the stepped sine wave output of the embodiment of FIG. 1.

The binary counter 17 produces a four-bit output having 16 different counts, namely, 0, 1 through 15, which are cyclically related to the number of CP3 clock pulses applied to the binary counter 17. Each count of the counter represents an additional $2\pi/16$ degrees (22.5°) of angular rotation of one cycle of the system output frequency over and above the previous count of the counter 17. The four-bit output of the binary counter 17 is applied to a read-only memory 19 which may be any suitable type such as an XC170 manufactured by Motorola. Also it is to be noted that any type of suitable storage element may be utilized within the scope of the invention and may include read-write as well as read-only types. The read-only memory 19 stores in its address locations 16 eight-bit words with each word corresponding to the sine of some integral multiple of $2\pi/16$ degrees. The eight-bit word from the read-only memory 19 is applied to a conventional digital-to-analog (D/A) converter 21, which converts the sequence of digital words from the memory 19 into a sequence of steps of analog voltages to thereby synthesize an output signal with a frequency $f_0$. A synthesized output signal is illustrated in FIG. 2 which shows a stepped sine wave output varying back and forth from a positive voltage level $+V_p$ through a zero voltage level 0V to a negative voltage level $-V_p$, for the period from time $t_0$ to time $t_{35}$. As shown in FIG. 2, the amplitude of any given step related to an angle in the stepped sine wave output is proportional to the difference between the magnitude of the sine of that angle and the sine of the angle immediately preceding that angle.

To further illustrate the correlation of the readout from the memory 19 to the count of the binary counter 17, reference is now made to Table I below which illustrates a sine function table for producing an output binary number Column 6 approximately equal to the particular value of the angle Column 2 with which the table was entered.

TABLE I

| Column 1 | Column 2 | Column 3 | Column 4 | Column 5 | Column 6 | Column 7 |
|---|---|---|---|---|---|---|
| Count of counter 17 | Angle (degrees) | Sine of angle | Sine ×127 | Sine ×127 +128 | Memory readout | FIG. 2 periods |
| 0 | 0 | 0.0000 | 0 | 128 | 10000000 | $t_{12-13}$ |
| 1 | 22.5 | +0.3827 | +49 | 177 | 10110001 | $t_{13-14}$ |
| 2 | 45.0 | +0.7071 | +90 | 218 | 11011010 | $t_{14-15}$ |
| 3 | 67.5 | +0.9239 | +117 | 245 | 11110101 | $t_{15-16}$ |
| 4 | 90.0 | +1.0000 | +127 | 255 | 11111111 | $t_{16-17}$ |
| 5 | 112.5 | +0.9239 | +117 | 245 | 11110101 | $t_{17-18}$ |
| 6 | 135.0 | +0.7071 | +90 | 218 | 11011010 | $t_{18-19}$ |
| 7 | 157.5 | +0.3827 | +49 | 177 | 10110001 | $t_{19-20}$ |
| 8 | 180.0 | 0.0000 | 0 | 128 | 10000000 | $t_{20-21}$ |

TABLE I –Continued

| Column | | | | | | |
|---|---|---|---|---|---|---|
| 1 | 2 | 3 | 4 | 5 | 6 | 7 |
| Count of counter 17 | Angle (degrees) | Sine of angle | Sine ×127 | Sine ×127 +128 | Memory readout | FIG. 2 periods |
| 9 | 202.5 | −0.3827 | −49 | 79 | 01001111 | $t_{21-22}$ |
| 10 | 225.0 | −0.7071 | −90 | 38 | 00100110 | $t_{22-23}$ |
| 11 | 247.5 | −0.9239 | −117 | 11 | 00001011 | $t_{23-24}$ |
| 12 | 270.0 | −1.0000 | −127 | 1 | 00000001 | $t_{24-25}$ |
| 13 | 292.5 | −0.9239 | −117 | 11 | 00001011 | $t_{25-26}$ |
| 14 | 315.0 | −0.7071 | −90 | 38 | 00100110 | $t_{26-27}$ |
| 15 | 337.5 | −0.3827 | −49 | 79 | 01001111 | $t_{27-28}$ |

Column 1 indicates the count of the counter 17 which is applied to the read-only memory 19 to call up The memory address read out of Column 6 corresponding to the state of the counter 17. Columns 2 through 5 illustrate how the information in column 6 is derived from information in Column 1. Column 2 reveals the angles of rotation or phase angle of one cycle of the synthesized output frequency. These angles are shown in degrees for every 2π/16 or 22.5° of angular rotation for one complete cycle. Column 3 illustrates the sine of the angle of Column 2 in decimal form. Column 4 illustrates a translation of the levels in Column 3 by a factor of 127 to produce larger bipolar amplitudes. Column 5 illustrates an origin translation by 128 levels of the bipolar amplitudes contained in Column 4 to produce unipolar amplitudes above a "0" reference level. Column 6 illustrates the digital equivalents of the analog quantities shown in Column 5. Column 7 illustrates the periods of the voltage steps of FIG. 2 which are produced by the D/A converter 21 in response to the memory readout signals of Column 6. Thus, basically the read-only memory 19 stores the sines of the 16 different angles of Column 2 binary form in corresponding address locations which are addressed and read out according to the count of the counter 17, and then converted by D/A converter 21 into the analog voltage steps of FIG. 2.

To control the output frequency $f_0$ an arithmetic unit 14 is utilized to develop and to apply the inhibit signal to the inhibit circuit 13 in order to remove one clock pulse from the CP3 clock pulse train each time that an inhibit signal is developed. The arithmetic unit 14 may include any type of digital storage devices such as latch circuits 23 and 25, and a storage register 27 and a full adder 29, which may be of conventional types. The latch circuits 23 and 25, which are both temporary digital storage units, are respectively synchronized by the CP1 and CP2 clock pulses from the clock pulse generator 11. At each CP1 clock pulse time the digital information stored in latch circuits 25 is allowed to be passed into and stored in latch circuits 23, with the output of latch circuits 23 being applied to the adder 29. A frequency command number or a multibit binary word, which may be 20 bits in length, for example, is applied to and stored in the storage register 27. This multibit binary word is applied from some external source (not shown) which may be a computer, a set of flip-flops, a set of switches, or any suitable source of a multibit binary word. This command number of multibit binary word controls the output frequency $f_0$ from the D/A converter 21, as will be subsequently explained. The command number that is stored in the storage register 27 is applied to the adder 29 where it is added to the output of latch circuits 23 to produce a sum of these two binary quantities. The sum from the adder 29 is applied to the input of the latch circuits 25. At the time of the CP2 clock pulse, the output sum of the adder 29, which is now in a stabilized condition, is allowed to be temporarily stored in latch circuits 25. At the next CP1 clock pulse time, the output of latch circuits 25 is stored in the latch circuits 23. This operation continues such that at each CP1 clock pulse time the output of the latch circuits 25 is stored in the latch circuits 23, and at each CP2 clock pulse time the sum from the adder 29 is stored in the latch circuits 25.

To further explain the operation of the arithmetic unit 14 assume that the system of FIG. 1 is in its initial operation and no information is stored in either of the latch circuits 23 or 25 and that the designated command number is N. The command number N is continually presented to and stored in storage register 27 to command the desired output frequency $f_0$. At the first CP1 clock pulse time the "0" output from latch circuits 25 is stored in latch circuits 23 and presented to the input of adder 29 to be summed with the command number N to produce the sum N. At the first CP2 clock pulse time the stabilized sum N is applied to and stored in latch circuits 25. At the second CP1 clock pulse time the N in latch circuits 25 is stored in the latch circuits 23 and applied to adder 29 to be summed with the N from storage register 27 to produce the sum 2N. At the second CP2 clock pulse time the stabilized output sum 2N from the adder 29 is stored in latch circuits 25. At the third CP1 clock pulse time the 2N output of latch circuits 25 is stored in latch circuits 23 and added in adder 29 to the N in storage register 27 to produce the sum of 3N. At the third CP2 clock pulse time the stabilized output sum 3N of the adder 29 is stored in latch circuits 25. From the foregoing discussion it can be seen that at each CP1 clock pulse time whatever digital information was contained at the input of latch circuits 23 immediately before the clock pulse now appears at the output of latch circuits 23 after the occurrence of the CP1 clock pulse. This same conclusion is equally true of latch circuits 25 in relation to each CP2 clock pulse. Furthermore, it can be seen that the binary quantity being stored in latch circuits 25 continually increases until latch circuits 25 exceeds its storage capacity and overflows, at which time the most significant bit, which is applied to the inhibit circuit 13, changes from a "1" state to a "0" state. It is at the time that the MSB of latch circuits 25 changes from a "1" state to a "0" state that the following CP3 pulse is inhibited by the inhibit circuit 13. It should be realized that the following CP3 pulse could be inhibited when the MSB changes from a "0" state to a "1," or by other changes, by accordingly mechanizing some of the circuits of the embodiment of FIG. 1 (or FIG. 5) in a manner different than that shown and explained.

Referring again to FIG. 2 it is indicated, for example, that at time $t_{30}$ a CP3 pulse is inhibited due to the overflow from latch circuits 25. The inhibiting of the CP3 clock pulse at time $t_{30}$ has the effect of doubling the width of the step. The step from time $t_{29}$ to time $t_{31}$ is twice as long as any other step illustrated in FIG. 2. Furthermore, the rate at which the inhibit pulse occurs will determine the output frequency $f_0$. By increasing the amplitude of the frequency command number, latch circuits 25 overflows at a faster rate and inhibits more CP3 pulses during a given time interval, thereby causing the output frequency $f_0$ to decrease. The converse is also true since a decrease in the amplitude of the frequency command number will reduce the rate at which latch circuits 25 overflows, thereby decreasing the number of CP3 clock pulses that are inhibited within a given time interval which therefore results in an increase in the output frequency $f_0$. It can therefore be stated that the output frequency $f_0$ is an inverse function of the amplitude of the frequency command number. It is to be understood that the scope of the invention includes other type arrangements in the arithmetic unit 14, such as only one latch or digital storage unit operating with a clocked adder unit having a storage capability and input-output units or with a suitable digital computer.

Figure 3:
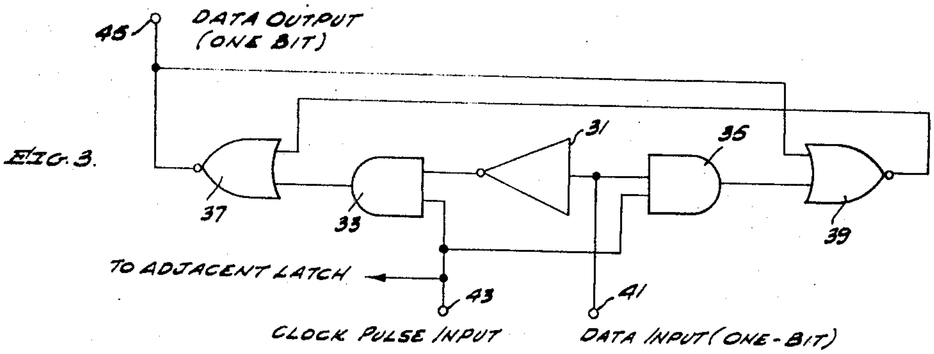
FIG. 3 is a schematic block diagram of one of the plurality of latches contained in either of the latch circuits 23 or 25 of FIG. 1.

FIG. 3 illustrates a schematic block diagram of one of the plurality of latches contained in either of the latch circuits 23 or 25 of FIG. 1. Each of the latch circuits 23 and 25 contains a latch, like that illustrated in FIG. 3, for each bit of information to be stored. For example, if 20 bits are desired to be stored, then each of the latch circuits 23 and 25 must contain a plurality of 20 cascaded latches of the type shown in FIG. 3.

Each latch, which may also be a flip-flop of a suitable type, comprises an inverter 31, AND gates 33 and 35, and NOR gates 37 and 39. Input data at a data input terminal 41 is applied to one input of the AND gate 35 and also through the inverter 31 to one input of the AND gate 33. Clock pulses at a clock pulse input terminal 43 are applied to the other inputs of the AND gates 33 and 35. The outputs of the AND gates 33 and 35 are connected respectively to inputs of the NOR gates 37 and 39 for control thereof. The outputs of the NOR gates 37 and 39 are respectively coupled to the other inputs of the NOR gates 39 and 37, with the output of the NOR gate 37 also being connected to a data output terminal 45. The operation of each latch is such that whatever binary state was present at the data input terminal 41 immediately before a clock pulse is applied to the clock pulse input terminal 43 at a time $t_n$ is transferred to the data output terminal 45 upon the occurrence of the clock pulse at a time $t_{n+1}$. Furthermore, whenever the clock pulse at the time $t_{n+1}$ is removed, the binary state that was present at the time the transition occurred is retained at the data output terminal 45 until the next clock pulse occurs. This operation of each latch is in conformance with the following truth table:

| Binary state at data input terminal 41 at time $t_n$ | Binary state at data output terminal 45 at time $t_{n+1}$ |
|---|---|
| 1 | 1 |
| 0 | 0 |

Figure 4:
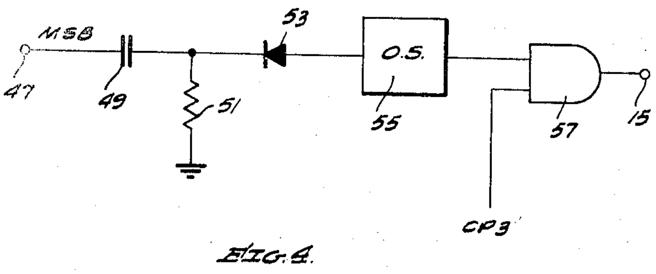
FIG. 4 is a schematic block diagram of the inhibit circuit of FIG. 1.

The operation of the inhibit circuit 13 will now be explained by referring to FIG. 4. The most significant bit (MSB) of the number stored in the latch circuits 25 is applied to terminal 47 of the inhibit circuit 13. Everytime that the latch circuits 25 exceeds its storage capacity and overflows, the MSB from the latch circuits 25 changes from a "1" state to a "0" state. The MSB then remains in the "0" state until the binary number being applied from the adder 29 to the latch circuits 25 reaches a predetermined binary count, at which time the MSB changes from a "0" state to a "1" state. The change in the logical state of the MSB from a "1" state to a "0" state or from a "0" state to a "1" state is differentiated by the serially connected differentiating network consisting of capacitor 49 and resistor 51 which are respectively coupled to the terminal 47 and ground. However, in the illustrated system, a diode 53, which is coupled between the input of a one-shot multivibrator 55 and the junction of the capacitor 49 and resistor 51, only passes the negative spike or pulse produced when the MSB changes from a "1" state to a "0" state. This negative spike triggers the one-shot multivibrator 55 causing its output to go to a "0" state. The output of the one-shot multivibrator 55 is applied to the upper input of an AND gate 57. CP3 clock pulses are applied to the lower input of the AND gate 57. When the output of the one-shot multivibrator is in a "1" state, the CP3 clock pulses pass through the AND gate 57 to the terminal 15 without being inhibited; but when the output of the one-shot multivibrator is in a "0" state, the CP3 clock pulse train is prevented from passing through the AND gate 57. The recovery time of the one-shot multivibrator 55 is adjusted so that it does not exceed the interpulse period of the CP3 clock pulse. As a result, the inhibit circuit 13 only inhibits the CP3 clock pulse which occurs immediately after the latch circuits 25 overflows.

Figure 5:
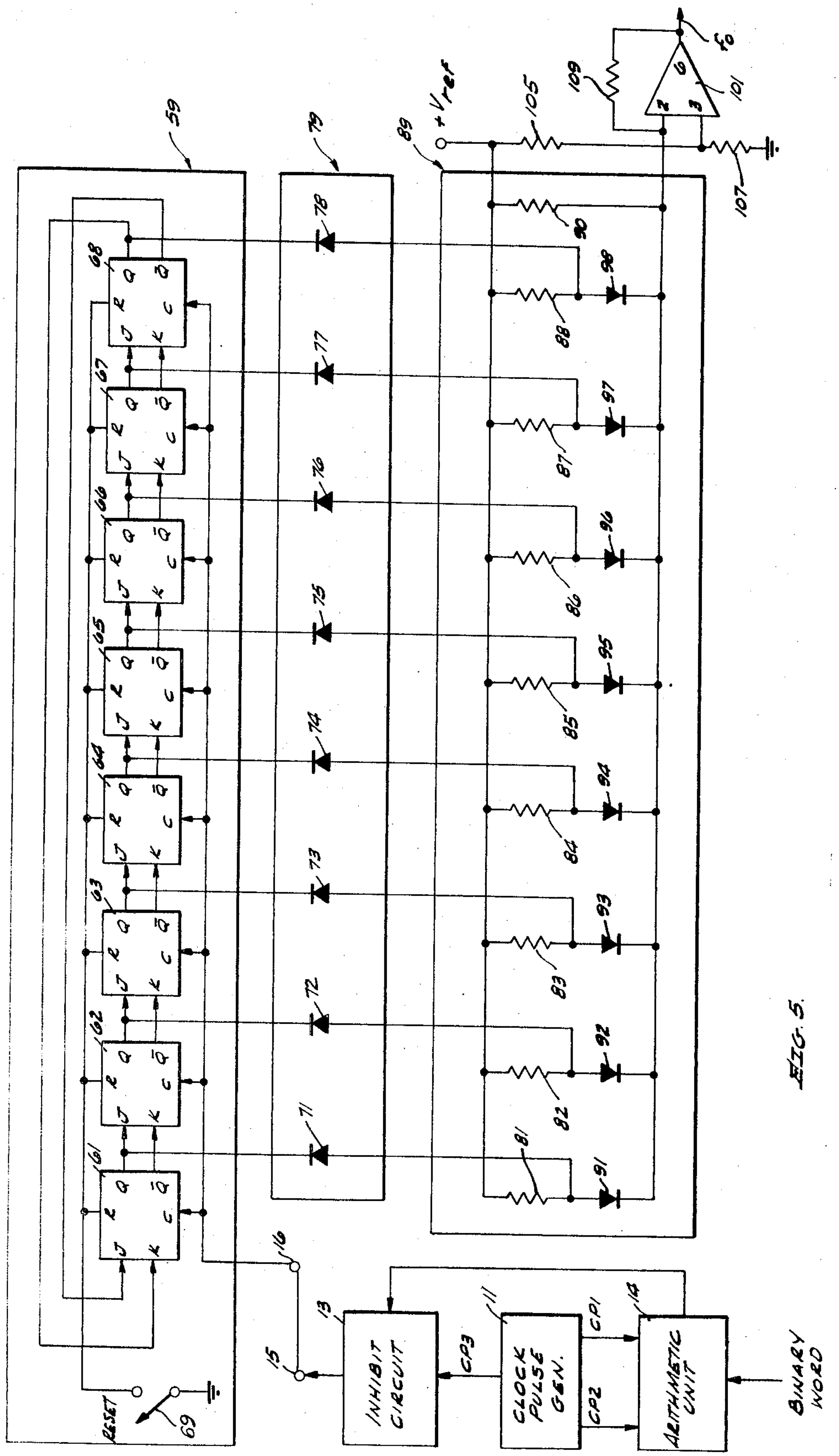
FIG. 5 is a schematic circuit and block diagram of a digital phase shift frequency synthesizer in accordance with a second embodiment of this invention.

FIG. 5 illustrates a schematic circuit and block diagram of a digital phase shift frequency synthesizer in accordance with a second embodiment of this invention. The embodiment of FIG. 5 can best be explained by also referring to FIG. 6. In the mechanization of FIG. 5 the inhibit circuit 13, clock pulse generator 11, and arithmetic unit 14 are identical in structure, interconnections and operation to the corresponding units discussed in relation to FIG. 1 and are used to supply the periodically interrupted stream of CP3 clock pulses to the terminal 15. The CP3 clock pulses are supplied from the terminal 15 and through the terminal 16 to the clock pulse inputs C of an eight-stage ring counter 59, comprised of the sequentially coupled conventional J-K flip-flops 61 through 68. The $\overline{Q}$ and Q outputs of each of the J-K flip-flops 61 through 67 are respectively coupled to the J and K inputs of the J-K flip-flops 62 through 68. However, the Q and $\overline{Q}$ outputs of the flip-flop 68 are respectively switched and coupled to the K and J inputs of the J-K flip-flop 61. Each of the J-K flip-flops 61 through 68 has its reset R terminal coupled to a reset switch 69. This reset switch 69 when closed applies a ground to the reset terminals of the J-K flip-flops 61 through 68 to set the Q output of all of these flip-flops to a "0" state at time $t_0$ as indicated in FIG. 6.

The reset switch 69 may be a spring loaded switch for manually resetting the flip-flops or may be a time controlled device automatically operated for a short duration of time after power is applied to the system in order to generate the reset pulse for the flip-flops 61 through 68.

In initial operation, as specified before, each of the flip-flops 61 through 68 is reset by the reset switch 69 so that its Q output is in a "0" state. The $\overline{Q}$ output terminal has the inverted logical state thereon of the Q output terminal. In operation each of the J-K flip-flops 61 through 68 transfers the logical state at its J and K inputs to its Q and $\overline{Q}$ outputs respectively at each clock pulse time. Immediately after the flip-flops are reset the J and K inputs of each of the J-K flip-flops 62 through 68 are in "0" and "1" states respectively, while the J and K inputs of the J-K flip-flop 61 are in "1" and "0" states respectively due to the switched inputs from the J-K flip-flop 68. Subsequent to the application of the clock pulse at time $t_1$, as indicated in FIG. 6, the Q output of the flip-flop 61 changes from a "0" state to a "1" state since the J input of the flip-flop 61 immediately prior to the application of the clock pulse at time $t_1$ was in a "1" state. However, each of the Q outputs of the flip-flops 62 through 68 remains in a "0" state after the clock pulse occurring at time $t_1$ since the J input of each of these flip-flops was in a "0" state during the application of the clock pulse at this time. Upon the application of the clock pulse at time $t_2$ the Q output of flip-flop 61 remains in a "1" state, the Q output of flip-flop 62 changes to a "1" state, and the Q output of each of the flip-flops 63 through 68 remains in a "0" state. This operation is for the reasons previously given, namely that each J-K flip-flop transfers the logical states at its J and K inputs to its respective Q and $\overline{Q}$ outputs at the clock pulse time. It should be apparent to one skilled in the art that the Q outputs of the flip-flops 61 through 68 will change in accordance with the output wave shapes shown in FIG. 6 for the times $t_0$ and $t_1$ through $t_{29}$, with only one of the flip-flops 61 through 68 changing its Q output state at any given CP3 clock pulse time. The net effect of this is that the Q outputs of the flip-flops 61 through 68 will sequentially change at each clock pulse time with all the Q outputs being in the "1"state between the times $t_8$ and $t_9$. At time $t_9$ the Q output of flip-flop 61 changes to a "0" due to the fact that the $\overline{Q}$ output of flip-flop 68, and hence the J input of flip-flop 61, was in a "0" state after the occurrence of the clock pulse at time $t_8$. In order to prevent the output state of more than one flip-flop from being changed by a single CP3 clock pulse, a suitable delay may be provided in each of the flip-flops 61 through 68 such that each flip-flop does not change its output state until the clock pulse has been terminated, which may be designed into each flip-flop or provided by a suitable delay line in a manner well-known in the art. The "0" state at the output of the flip-flop 61 will be sequentially transferred to the Q outputs of the remaining flip-flops 62 through 68 and at the respective clock pulse times of $t_{10}$ through $t_{16}$, as shown in FIG. 6, pursuant to the previously described operation of each J-K flip-flop. From time $t_{16}$ to time $t_{17}$ the Q output of each of the flip-flops 61 through 68 will be in a "0" state, identical to the flip-flop states from time $t_0$ to time $t_1$, and then the cycle will start to repeat itself. An examination of FIG. 6 will reveal that between the times $t_0$ through $t_{29}$ the Q output of each of the flip-flops periodically produces an output composed of a sequence of eight "1" state bits followed by eight "0" state bits.

Figure 6:
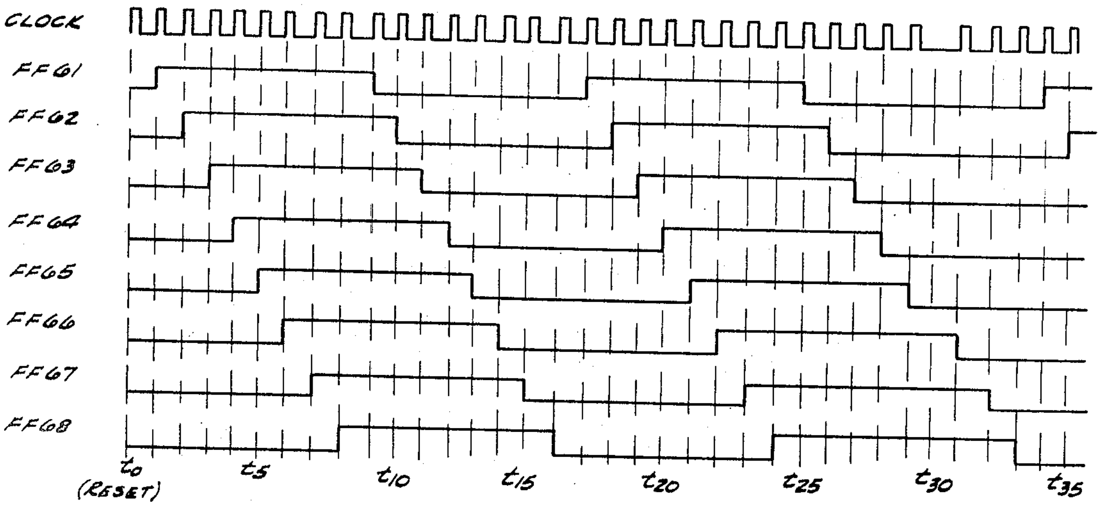
FIG. 6 illustrates graphs of the Q-outputs from the J-K flip-flops 61–68 of the embodiment of FIG. 5.

Attention is directed to the fact that at or immediately prior to the time $t_{30}$ in FIG. 6, the arithmetic unit 14 overflows and causes the inhibit circuit 13 to inhibit the CP3 clock pulse at the time $t_{30}$. The inhibiting of the CP3 clock pulse at time $t_{30}$ prevents the flip-flop 66 from changing to a "0" state until the occurrence of the following clock pulse at time $t_{31}$ thereby delaying the sequential shifting of the logical states through the ring counter 59 by one clock pulse period, and temporarily increasing the interpulse period of the Q (and $\overline{Q}$ as well) outputs of the flip-flops 61 through 68 from 16 to 17 CP3 interpulse periods in duration for each cycle during which each inhibit pulse occurs. It should be noted that the first inhibit pulse (MSB) from the arithmetic unit 14 may occur at any preselected time, for example at the 500th, 100,000th, 1,000,000th or 5,000,000th, etc., CP3 clock pulse time, depending upon the sum capacity of the adder 29 and the amplitude of the frequency command number being applied to the storage register 27.

The Q outputs of the flip-flops 61 through 68 are respectively applied to the cathodes of diodes 71 through 78, which form a switch network 79. The anodes of the diodes 71 through 78 are respectively coupled to a positive voltage reference ($+V_{ref}$), which for example may be +10 volts, through resistors 81 through 88 which form part of a weighted resistor network 89. These resistors are symmetrically weighted such that resistors 81 and 88 are equal to a first value, 82 and 87 are equal to a second value, 83 and 86 are equal to a third value, and 84 and 85 are equal to a fourth value. The resistor network 89 is symmetrically weighted to enable the embodiment of FIG. 5 to produce at its output a stepped sine wave similar to that shown in FIG. 2, as will be subsequently explained. When used for this particular application the values of the weighted resistors 81 and 88, 82 and 87, 83 and 86, and 84 and 85 may be approximately equal in kilohms to 8, 2.9, 1.95, and 1.63, respectively. The other portion of the weighted resistor network 89 is comprised of an input resistor 90 coupled between $+V_{ref}$ and the inverting input pin 2 of an operational amplifier 101, and the diodes 91 through 98 which have their cathodes commonly connected to the inverting input pin 2 of the operational amplifier 101 and their anodes respectively coupled to the anodes of the diodes 71 through 78. The operational amplifier 101 can be of any suitable type such as a Fairchild μA709C high performance operational amplifier manufactured by Fairchild Semiconductor Corporation. Serially connected resistors 105 and 107 form a voltage divider which is coupled between $+V_{ref}$ and ground. The junction of the resistors 105 and 107 is coupled to the noninverting input pin 3 of the operational amplifier 101 in order to maintain pin 3 at approximately +2 volts. A feedback resistor 109 is coupled between the inverting pin 2 and output pin 6 of the operational amplifier 101 to supply a sufficient feedback voltage from the output pin 6 to the inverting input pin 2 to maintain the voltage level at the inverting input pin 2 at approximately the same voltage ($+2V$) as that being applied to the noninverting pin 3. The output synthesized frequency $f_o$ is taken from the output pin 6 of the operational amplifier 101.

The operation will be more fully explained by referring to FIG. 5 and the waveforms of FIG. 6. The analog voltage output $E_o$ from the output pin 6 of the operational amplifier 101 during any given period of time may be approximately defined by the equation:

$$E_o = V_{R107} - \frac{R_{109}}{R_{89}}[V_{ref} - V_{R107}] = 2 - 8\left[\frac{R_{109}}{R_{89}}\right]$$

where:

$E_o$ = the output signal voltage at the output pin 6 of the operational amplifier 101.

$R_{109}$ = the feedback resistance of resistor 109.

$R_{89}$ = the output resistance effectively placed by the weighted resistor network 89 between $+V_{ref}$ and the inverting input pin 2 of the operational amplifier 101 during any given period of time.

$V_{ref}$ = the positive reference voltage.

$V_{R107}$ = the voltage applied to the noninverting input pin 3 of the operational amplifier 101 $\cong +2V$ During the period from $t_0$ to $t_1$ the Q outputs of all of the flip-flops 61 through 68 are in a "0" state condition. For illustrative purposes assume that the "0" and "1" states of the Q output of each of the flip-flops 61–68 are respectively equal to 0 to +4 volts. Therefore, during this $t_0$–$t_1$ period current will flow from the $+V_{ref}$ ($+10V$) respectively through the resistors 81 through 88 and through forward-biased diodes 71 through 78 into the Q outputs of the flip-flops 61 through 68, respectively. No current will flow through the diodes 91 through 98 since these diodes are reverse-biased by the respective conduction of the diodes 71 through 78. Since the diodes 91 through 98 are all reverse-biased, no other resistance is parallel coupled to the resistor 90. As a result the resistance presented by $R_{89}$ will be maximum at this time. By referring to the aforementioned equation it can be seen that when $R_{89}$ is maximum, the output voltage $E_o$ from the operational amplifier 101 is at a maximum value.

During the period from $t_1$ to $t_2$ the Q outputs of the flip-flops 62 through 68 remain in the "0" state condition while the Q output from the flip-flop 61 is in a "1" state or +4 volt condition which reverse-biases the diode 71. The reverse-biasing of the diode 71 allows the diode 91 to become forward-biased, thereby effectively placing the resistor 81 in parallel with the resistor 90. Since the resistors 81 and 90 are parallel coupled the output resistance of $R_{89}$ decreases. A decrease in the value of resistance presented by $R_{89}$, according to the above equation, causes the output voltage $E_o$ to decrease. During the next period from $t_2$ to $t_3$, as shown in FIG. 6, the Q outputs of the flip-flops 61 and 62 are in a "1" state or $+4\ V$ level which effectively parallel couples the resistors 81 and 82 to resistor 90, thereby further decreasing $E_o$. It should be obvious to those skilled in the art that during the $t_1$–$t_2$, $t_2$–$t_3$, $t_3$–$t_4$, $t_4$–$t_5$, $t_5$–$t_6$, $t_6$–$t_7$, $t_7$–$t_8$ and $t_8$–$t_9$ periods of time $E_o$ will sequentially decrease to a minimum voltage, and that during time $t_9$–$t_{10}$, $t_{10}$–$t_{11}$, $t_{11}$–$t_{12}$, $t_{12}$–$t_{13}$, $t_{13}$–$t_{14}$, $t_{14}$–$t_{15}$, $t_{15}$–$t_{16}$ and $t_{16}$–$t_{17}$ periods of time $E_o$ will sequentially increase to a maximum voltage. This sequential switching in and out of the resistors in the weighted resistor network 89 will produce an output wave shape, at the output pin 6 of the operational amplifier 101, similar to that shown in FIG. 2. It should be noted at this time that the value of the resistor 90 is selected so that the output voltage $E_o = 0V$ when only the resistors 81 through 84 (or only 85–88) are paralleled with the resistor 90, for example during the period $t_4$–$t_5$ (or $t_{12}$–$t_{13}$). Furthermore, based on the foregoing discussion it should also be noted that the embodiment of FIG. 5 may be modified by the utilization and arrangement of other types of ring counters, and diode and resistor combinations to produce the stepped sine wave output shown in FIG. 2.

As specified before, the inhibiting of the CP3 clock pulse will produce a stepped sine wave output and at the time $t_{30}$ will produce a doubling of the step width at the output pin 6 of the operational amplifier 101 for the period $t_{29}$–$t_{31}$ similar to that shown in FIG. 2. The output frequency $f_0$ of each of the embodiments of FIGS. 1 and 5 is therefore comprised of a plurality of sequentially increasing and decreasing phase shift increments or voltage steps. These phase shift increments provide some harmonic distortion of the output sine wave. It has been found by analysis that the amount of harmonic distortion of the output sine wave is an inverse function of the number of phase shift increments employed to accomplish a phase rotation of the stepped sine wave signal of the output frequency $f_o$. This analysis has shown that with each doubling of the number of phase shift increments in relation to one cycle of the stepped sine wave output, there is approximately a 6 db reduction in the harmonic distortion in the output. To illustrate, if in FIG. 1 the counter 17 had 32 different counts and the read-only memory 19 had 32 address locations or in FIG. 5 the number of J-K flip-flops and their associated diode and resistor networks were doubled, the number of phase shift increments used to produce one cycle of the stepped sine wave output would be increased from the 16 illustrated in FIG. 2 to 32, thereby resulting in an approximate 6 db reduction in the harmonic distortion in the output. With a 16-fold increase in the number of phase shift increments there is approximately a 24 db reduction in the harmonic distortion in the output.

Figure 7:
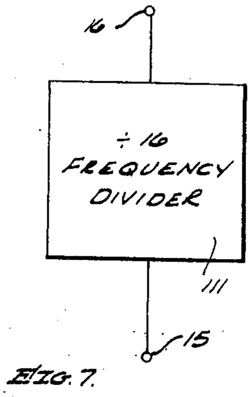
FIG. 7 is a schematic block diagram of a frequency divider which, when added to either of the embodiments of FIGS. 1 and 5, enables either resultant embodiment to reduce the amount of harmonic distortion in the output signal.

FIG. 7 illustrates a divide-by-sixteen ( 16) frequency divider 111 which can be utilized in either of the embodiments of FIGS. 1 and 5 when it is desirable to reduce the harmonic distortion in the output without increasing the number of phase shift increments in one cycle of the stepped sine wave output. As a result the embodiments of FIGS. 1 and 5 remain basically unchanged. The frequency divider 111 is added to either of the embodiments of FIGS. 1 and 5 by breaking the line connecting the terminals 15 and 16 and coupling the frequency divider 111 therebetween, as shown in FIG. 7. It should be understood that a frequency divider other than a divide-by-sixteen can be used, as long as the frequency of the CP3 clock pulses and the rate at which the CP3 pulses are inhibited are both accordingly increased, preferably by a factor equal to the number by which the frequency is divided by the frequency divider 111. When a divide-by-sixteen frequency divider 111 is utilized, the CP3 clock pulse frequency and the rate at which the CP3 pulses are inhibited should both be increased by a factor of 16, if it is desired to operate with the same output frequency. The rate at which the CP3 clock pulses are inhibited can be increased by a factor of 16 by increasing the frequency of the CP1 and CP2 clock pulses by the factor 16, by increasing the amplitude of the binary word by a factor of 16, or by decreasing the adder 29 capacity to one-sixteenth of its former capacity.

FIG. 2 illustrates between times $t_{29}$ and $t_{31}$ the doubling of the duration of one step each time that an inhibit pulse is generated by the arithmetic unit 14. Now with a 16-fold increase in the frequency of the CP3 clock pulses and in the frequency of the inhibit pulses, the CP3 clock pulses are inhibited by the inhibit circuit 13 16 times as often as before. The output of the inhibit circuit 13 is then counted down by the frequency divider 111, thereby causing the output frequency $f_o$ to contain significantly less harmonic distortion than that shown in FIG. 2, since now an overall width increase in a phase shift increment can be spread out over a plurality of step widths rather than being concentrated in the doubling of just one step width. As a result, the increase in the step width of any given phase shift increment is no more than one-sixteenth of a step width, as contrasted with the doubling of the step width as shown in FIG. 2 between the times $t_{29}$ and $t_{31}$.

The invention thus provides an improved digital phase shift frequency synthesizer which provides a large number of phase shift increments per output cycle.

While the salient features have been illustrated and described with respect to two particular embodiments, it should be readily apparent to those skilled in the art that modifications can be made within the spirit and scope of the invention as set forth in the appended claims.

What is claimed is:

1. A frequency synthesizer system comprising:
a clock pulse generator for producing a sequence of first clock pulses;
an inhibit circuit coupled to said clock pulse generator, said inhibit circuit being responsive to inhibit signals applied thereto at a predetermined rate for inhibiting one of the first clock pulses each time that an inhibit signal is applied thereto and passing all other first clock pulses therethrough when no inhibit signal is applied thereto;
counter means coupled to said generator means for producing a plurality of digital signals as a function of the first clock pulses applied thereto; and
output means coupled to said counter means for generating an output signal at a desired frequency in response to the plurality of digital signals from said counter means.

2. The system of claim 1 further including:
means coupled to said inhibit means for developing inhibit signals at the predetermined rate, said counter means being responsive to a change in the predetermined rate that the inhibit signals inhibit the first clock pulses for causing said output means to change the output frequency as a function of the rate that the first clock pulses are inhibited.

3. The system of claim 1 wherein:
said counter means is a binary counter and said plurality of digital signals represent a sequence of digital counts developed by said binary counter as a function of the number of clock pulses applied thereto.

4. A frequency synthesizer system comprising:
generator means for producing a sequence of first clock pulses;
counter means coupled to said generator means for producing a plurality of digital signals as a function of the first clock pulses applied thereto, said counter means being a binary counter and said plurality of digital signals representing a plurality of digital counts developed by said binary counter as a function of the clock pulses applied thereto; and
output means coupled to said counter means for generating a desired output frequency in response to the plurality of digital signals from said counter means, said output means including a memory circuit coupled to said binary counter, said memory circuit having a plurality of address locations respectively corresponding to the plurality of digital counts of said binary counter for producing a plurality of multibit numbers respectively corresponding to a plurality of phase angles of one cycle of the output frequency, and a digital-to-analog converter coupled to said memory circuit, said converter being selectively responsive to the plurality of multibit numbers therefrom for generating the desired output frequency.

5. The system of claim 4 further including:
inhibit means coupled between said generator means and said binary counter, said inhibit means being responsive to inhibit signals applied thereto at a predetermined rate for inhibiting one of the first clock pulses each time that an inhibit pulse is applied thereto, said binary counter being responsive to a change in the predetermined rate that the inhibit signals inhibit the first clock pulses for causing said output means to change the output frequency as a function of the rate that the first clock pulses are inhibited.

6. The system of claim 5 in which said generator means further develops sequences of second and third clock pulses and further including:
an arithmetic unit coupled to said inhibit means and said generator means and being responsive to the sequences of second and third clock pulses from said generator means and to a binary command number applied thereto to control the output frequency by developing and applying the inhibit signals to said inhibit means at a rate determined by the amplitude of the binary command number.

7. The system of claim 6 wherein said arithmetic unit includes:
storage means responsive to the application of the binary command number for storing same therein;
adder means coupled to said storage means for receiving the binary command number stored therein; and
first and second latch means coupled to said generator means, said adder means and to each other for temporarily storing digital numbers, said first latch means being responsive to each of the second clock pulses from said generator means for applying the digital number stored in said second latch means to said adder means, said adder means adding the digital number being applied thereto to the binary command number to produce a summed output, said second latch means being responsive to each of the third clock pulses from said generator means for storing the summed output of said adder means therein, said second latch means producing an inhibit signal each time that said adder means overflows its storage capacity.

8. The system of claim 1 wherein:
said counter means is a ring counter for producing the plurality of digital signals as a function of the first clock pulses applied thereto, said ring counter being responsive to a change in the predetermined rate that the inhibit signals inhibit the first clock pulses for causing said output means to change the output frequency as a function of the rate that the first clock pulses are inhibited.

9. The system of claim 9 wherein said output means includes:
a plurality of switching means coupled to said ring counter for selectively providing a plurality of switching output voltages as a function of the plurality of digital signals;
amplifier means for developing the desired output frequency, said amplifier means having an input impedance; and a plurality of resistance branches selectively coupled between said plurality of switching means and said amplifier means for sequentially varying the input impedance of said amplifier means as a function of the plurality of switching output voltages, said amplifier means being responsive to the sequential variations of its input impedance for developing the desired output frequency.

10. The system of claim 9 wherein said amplifier means is an operational amplifier.

11. The system of claim 10 in which said clock pulse generator further develops sequences of second and third clock pulses and further including:

an arithmetic unit coupled to said inhibit means and said clock pulse generator and being responsive to the sequences of second and third clock pulses from said clock pulse generator and to a binary command number applied thereto to control the output frequency by developing and applying the inhibit signals to said inhibit means at a rate determined by the amplitude of the binary command number.

12. The system of claim 10 wherein said arithmetic unit includes:

storage means responsive to the application of the binary command number for storing same therein;

adder means coupled to said storage means for receiving the binary command number stored therein; and first and second latch means coupled to said clock pulse generator, said adder means and to each other for temporarily storing digital numbers, said first latch means being responsive to each of the second clock pulses from said clock pulse generator for applying the digital number stored in said second latch means to said adder means, said adder means adding the digital number being applied thereto to the binary command number to produce a summed output, said second latch means being responsive to each of the third clock pulses from said clock pulse generator for storing the summed output of said adder means therein, said second latch means producing an inhibit signal each time that said adder means overflows its storage capacity.

13. A frequency synthesizer comprising:

pulse generating means for producing sequences of clock pulses;

control means coupled to said pulse generating means for developing inhibit signals;

inhibit means coupled to said pulse generating means and said control means and responsive to said inhibit signals for selectively passing clock pulses;

counter means coupled to said inhibit means for developing digital signals as a function of the clock pulses passed by said inhibit means; and conversion means coupled to said counter means for converting the digital signals to a signal with a desired output frequency.

* * * * *

PO-1050
(5/69)

UNITED STATES PATENT OFFICE
CERTIFICATE OF CORRECTION

Patent No. 3,657,635 Dated April 18, 1972

Inventor(s) Richard D. Quinn

It is certified that error appears in the above-identified patent and that said Letters Patent are hereby corrected as shown below:

Claim 9, Column 10, line 69, change "9" to --8--.

Signed and sealed this 8th day of August 1972.

(SEAL)
Attest:

EDWARD M.FLETCHER,JR.
Attesting Officer

ROBERT GOTTSCHALK
Commissioner of Patents